United States Patent
Mori et al.

[11] Patent Number: 6,003,642
[45] Date of Patent: Dec. 21, 1999

[54] PAD CLIP FOR A DISC BRAKE

[75] Inventors: Hisashi Mori; Seiya Odaka, both of Tokyo, Japan

[73] Assignee: Akebono Brake Industry Co., Ltd., Tokyo, Japan

[21] Appl. No.: 08/937,057

[22] Filed: Sep. 24, 1997

[30] Foreign Application Priority Data

Sep. 25, 1996 [JP] Japan .................................. 8-274121

[51] Int. Cl.⁶ ............................................... F16D 65/14
[52] U.S. Cl. ................................... 188/73.44; 188/73.37
[58] Field of Search ........................ 188/73.38, 73.35, 188/73.36, 250 B

[56] References Cited

U.S. PATENT DOCUMENTS 5,577,577  11/1996  Hirai et al. ............................ 188/73.36

FOREIGN PATENT DOCUMENTS 2-18353   5/1990   Japan .
2 172 068 9/1986   United Kingdom .

Primary Examiner—Robert J. Oberleitner
Assistant Examiner—Sarah M. Sawhill
Attorney, Agent, or Firm—Morgan, Lewis & Bockius LLP

[57] ABSTRACT

A pad clip 40 includes a U-shaped portion 46 which can be engaged with a guide projection 16 provided in a support 14. On one side of the U-shaped portion 46, a first spring portion 74 is continuously connected to a second spring portion 64. The first spring portion 74 includes a curved portion 76 and a leading end contact portion 82, such that the leading end contact portion 82 energizes a friction pad 20 outwardly in the rotor radial direction. The second spring portion 64 is protruded and curved in the rotor peripheral direction to thereby provide a projection shape. The protrusion top portion 70 of the second spring portion 64 is in contact with the friction pad 20, and the spring upper end portion 66 and lower end portion 68 of the second spring portion 64 are respectively in contact with the support 14, thereby energizing the friction pad 20 in the rotor peripheral direction. Thus, if the friction pad 20 moves in a manner like arrow 84 to thereby push and collapse the second spring portion 64, then the contact portion 82 will move upwardly, which increases the energizing force to energize the friction pad 20 outwardly in the rotor radial direction.

2 Claims, 8 Drawing Sheets

PAD CLIP FOR A DISC BRAKE

BACKGROUND OF THE INVENTION

The present invention relates to a pad clip for use in a disc brake which is used to brake a vehicle and, in particular, to an improved pad clip which holds a friction pad movable in the axial direction of a rotor in such a manner that the sliding resistance of the friction pad with respect to a support can be reduced.

Generally, in a disc brake, a pair of friction pads for holding a rotor between them are mounted on a support in such a manner that they can be moved in the axial direction of the rotor, the two friction pads are respectively moved in the rotor axial direction by a caliper and a hydraulic cylinder device pressed against the rotor, and, when the friction pads rotate together with the rotor, the side edge portions of the friction pads are supported by the support, thereby exerting a brake force. Since the friction pads are moved so as to be in contact with the surface of the rotor while they are being held by the support, between the support portions (anchor portions) of the support and the friction pads, pad clips are mounted to thereby reduce the sliding resistance of the friction pads (for example, Japanese Utility Model Publication No. 2-18353 of Heisei). FIG. 8 shows an example of a conventional pad clip of this type.

The conventional pad clip 10 includes, in its respective portions on the inner and outer sides of a rotor 12, U-shaped portions 18 (the U shape can be seen when the pad clip 10 is viewed from the side surface thereof) which can be respectively fitted with guide projections 16 respectively provided on the mutually opposing surfaces of a support 14. The guide projection 16 is used to guide the friction pad 20 slidingly in the rotor axial direction and can be inserted into a recessed portion 22 formed on the side end face of the friction pad 20, while the U-shaped portion 18 of the pad clip 10 is interposed between the wall surface of the recessed portion and the guide projection 16. Thus, the U-shaped portion 18 is composed of a bottom portion 24 in contact with the leading end face of the guide projection 16, and mutually opposing upper and lower pieces 26 and 28 which are respectively bent at the upper and lower ends of the bottom portion 24.

The upper side (rotor outer peripheral side) opposing piece 26 is structured such that the base end side thereof connected continuously with the bottom portion 24 is in contact with the wall surface of the recessed portion 22 of the friction pad 20, and the opposing piece 26 is also bent at an acute angle with respect to the bottom portion so that the leading end side thereof can be in contact with the upper surface of the guide projection 16. The, upper side opposing piece 26 cooperates with the lower side (rotor inner peripheral side) opposing piece 28 in holding the guide projection 16 between them, whereby the opposing pieces 26 and 28 are mounted on the support 14 and also elastically support the friction pad 20 through the recessed portion 22 thereof. In the upper side opposing piece 26, the leading end side thereof in contact with the guide projection 16 is further bent on the rotor outer peripheral side to thereby provide a connecting piece 30 and, in the leading end portion of the connecting piece 30, is formed a bridge portion which is used to connect the inner and outer sides to each other.

In addition, a torque receiving portion 34 is connected to the leading end side of the lower side opposing piece 28, which is formed by extending and bending the leading end portion of the lower side opposing piece 28 along the anchor portion 32 of the support member 14 provided at the opposed position of a pad anchor portion 31 of the friction pad 20. In the lower end of the torque receiving portion 34, there is provided integrally therewith a plate spring portion 36 including a curved leading end portion which is bent slightly upwardly toward the friction pad 20, while the leading end portion of the plate spring portion 36 is in contact with the lower surface of the friction pad 20 to thereby hold the friction pad 20 elastically.

In the thus structured conventional pad clip 10, the torque receiving portion 34 is in close contact with the anchor portion 32 of the support member 14 and, between the leading end face of the pad anchor portion 31 of the friction pad 20 and the torque receiving portion 34 of the pad clip 10, a gap δ is formed.

Therefore, when vibrations are applied to the caliper and the friction pad 20 is thereby moved like arrow 38 in a vehicle brake start time or the like, the leading end face of the pad anchor portion 31 taps the torque receiving portion 34 of the pad clip 10 and such tapping is transmitted to the support member 14, which causes a rattling sound or noise to be generated.

SUMMARY OF THE INVENTION

The present invention aims at eliminating the drawbacks found in the above-mentioned conventional pad clip. Accordingly, it is an object of the invention to provide a pad clip for a disc brake which can restrict the generation of the above rattling noise.

In attaining the above object, according to the invention, there is provided a pad clip which is used in a disc brake including a friction pad disposed opposed to a rotor and a support member for supporting a brake force from the friction pad and also which is mounted between the rotor peripheral direction end portion of the friction pad and the anchor portion of the support to support the friction pad, the pad clip comprising: a U-shaped portion which can be engaged with a projection provided in one of the mutually opposing portions of the friction pad and support; a first spring portion which is used to energize the friction pad outwardly in the radial direction of the rotor; and, a second spring portion which is disposed in a connecting portion for connecting the first spring portion with the U-shaped portion and is used to energize the friction pad in the peripheral direction of the rotor. Also, the second spring portion for energizing the friction pad in the rotor peripheral direction can be formed in a projecting shape which projects in the peripheral direction of the rotor.

According to the invention structured in the above-mentioned manner, due to the provision of the first spring portion for energizing the friction pad outwardly in the rotor radial direction and the second spring portion for energizing the friction pad in the rotor peripheral direction, if the pad clip is interposed between the friction pad and support member, then the second spring portion decreases a gap between the friction pad and pad clip and, therefore, even if the friction pad is moved in the rotor peripheral direction due to the vibration of a caliper, the possibility of generating a shock that causes the friction pad to tap the pad clip, is eliminated thereby restricting the generation of a rattling noise. Especially, if the second spring portion is formed in a projecting shape projecting in the rotor peripheral direction and is brought into contact with both friction pad and support, since there is no gap neither between the friction pad and second spring portion nor between the second spring portion and support member the restriction of the generation of the rattling noise can be achieved more effectively. Also, if the friction pad is moved in the rotor peripheral direction and is pressed against the projection-shaped second spring portion, then the energizing force of the first spring portion for energizing the friction pad in the rotor radial direction increases as the second spring portion is elastically deformed to collapse, which presses the end portion of the friction pad strongly against the support member through the U-shaped portion. That is, a multiplier effect can be obtained from the spring action due to the elastic deformation of the second spring portion and the energizing force of the first spring portion outward in the rotor radial direction, thereby restricting the generation of the rattling noise further.

BRIEF DESCRIPTION OF THE DRAWINGS

FIG. 1 is a typical view of a pad clip according to a first embodiment of the invention, showing a state thereof in which it is mounted in a disc brake;

FIG. 2 (1) is a plan view of the pad clip according to the first embodiment of the invention, and FIG. 2 (2) is a front view thereof;

FIG. 3 is a bottom view of the pad clip according to the first embodiment;

FIG. 4 is a section view taken along the line A—A shown in FIG. 2 (2);

FIG. 5 is an enlarged view of a B portion shown in FIG. 4;

FIG. 6 is a typical view of a pad clip according to a second embodiment of the invention, showing a state thereof in which it is mounted in a disc brake;

FIG. 7 is a typical view of a pad clip according to a third embodiment of the invention, showing a state thereof in which it is mounted in a disc brake; and,

FIG. 8 is a typical view of a conventional pad clip, showing a state thereof in which it is mounted in a disc brake.

DETAILED DESCRIPTION OF THE INVENTION

Now, description will be given below in detail of the preferred embodiments of a pad clip for a disc brake according to the invention with reference to the accompanying drawings.

Figure 1:
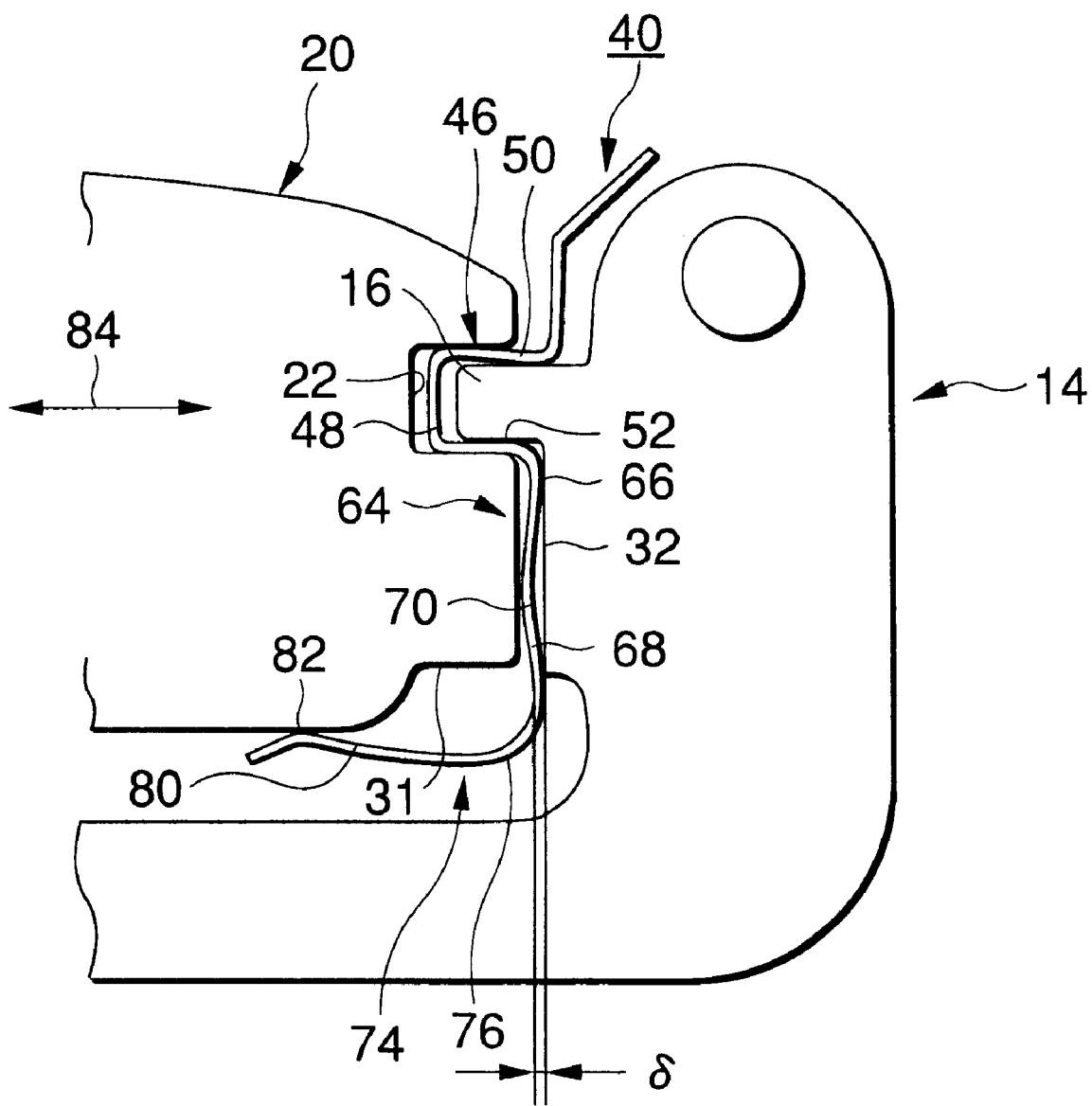
FIG. 1
Figure 2A:
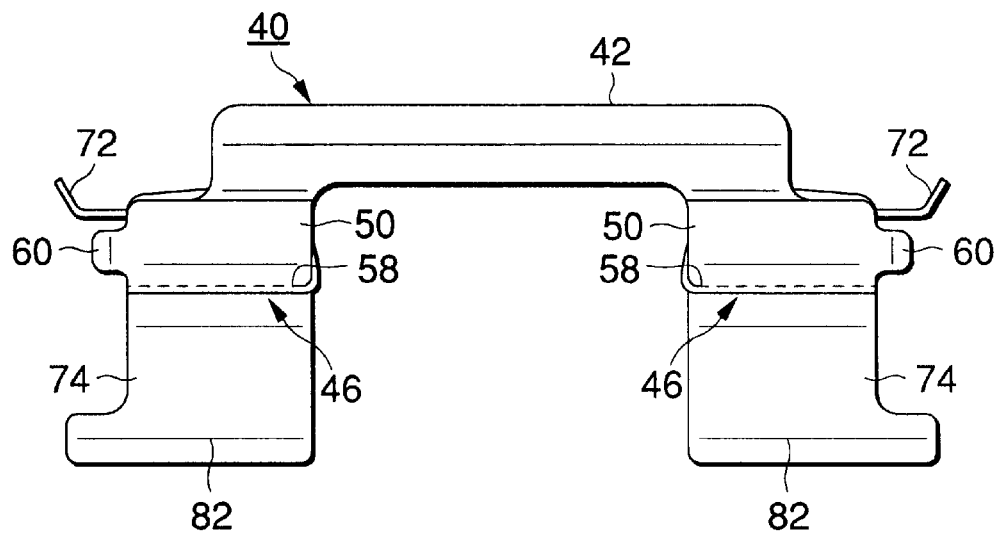
FIG. 2
Figure 2B:
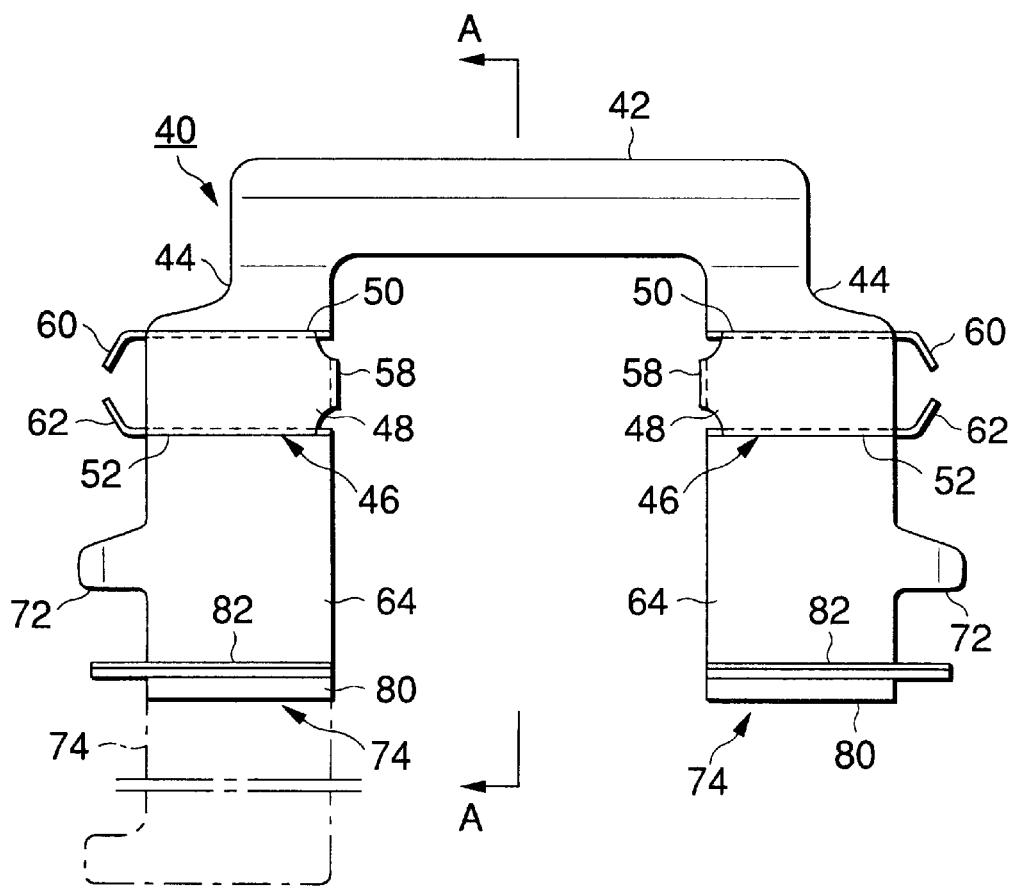
Figure 3:
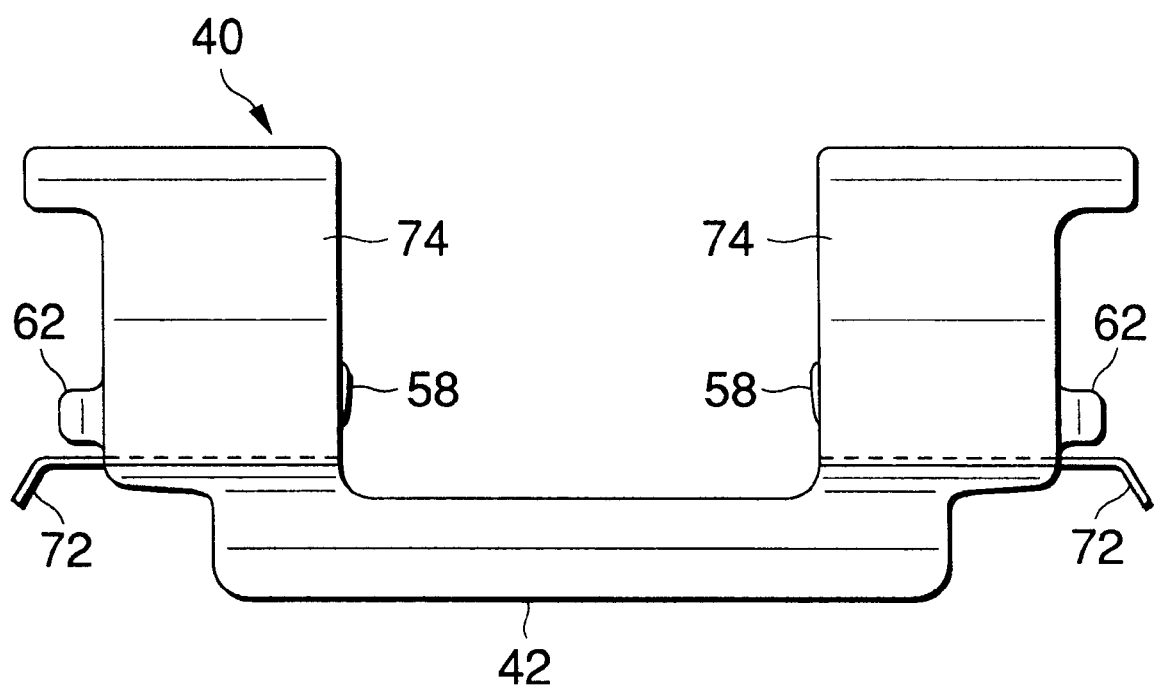
FIG. 3
Figure 4:
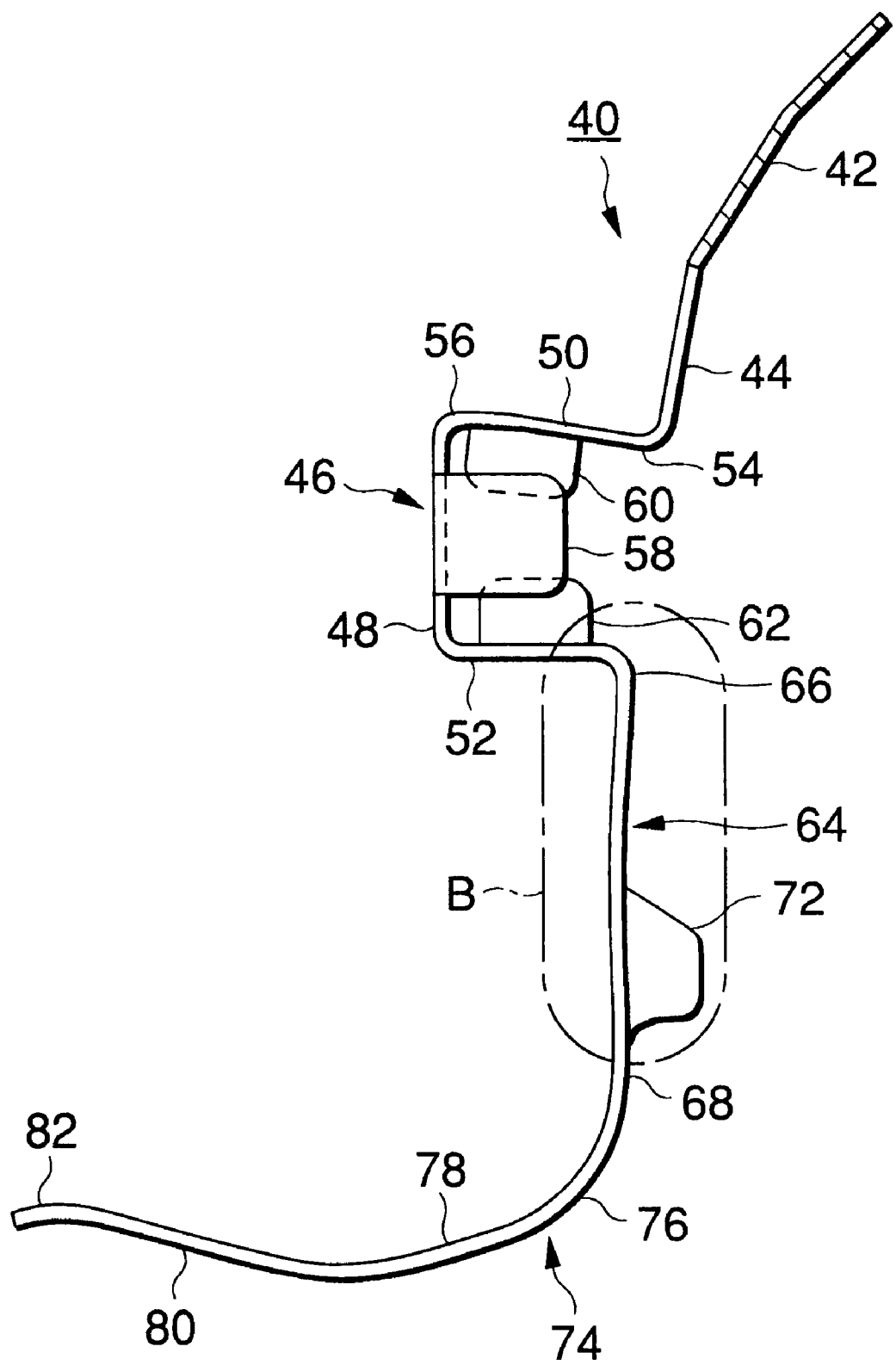
FIG. 4
Figure 5:
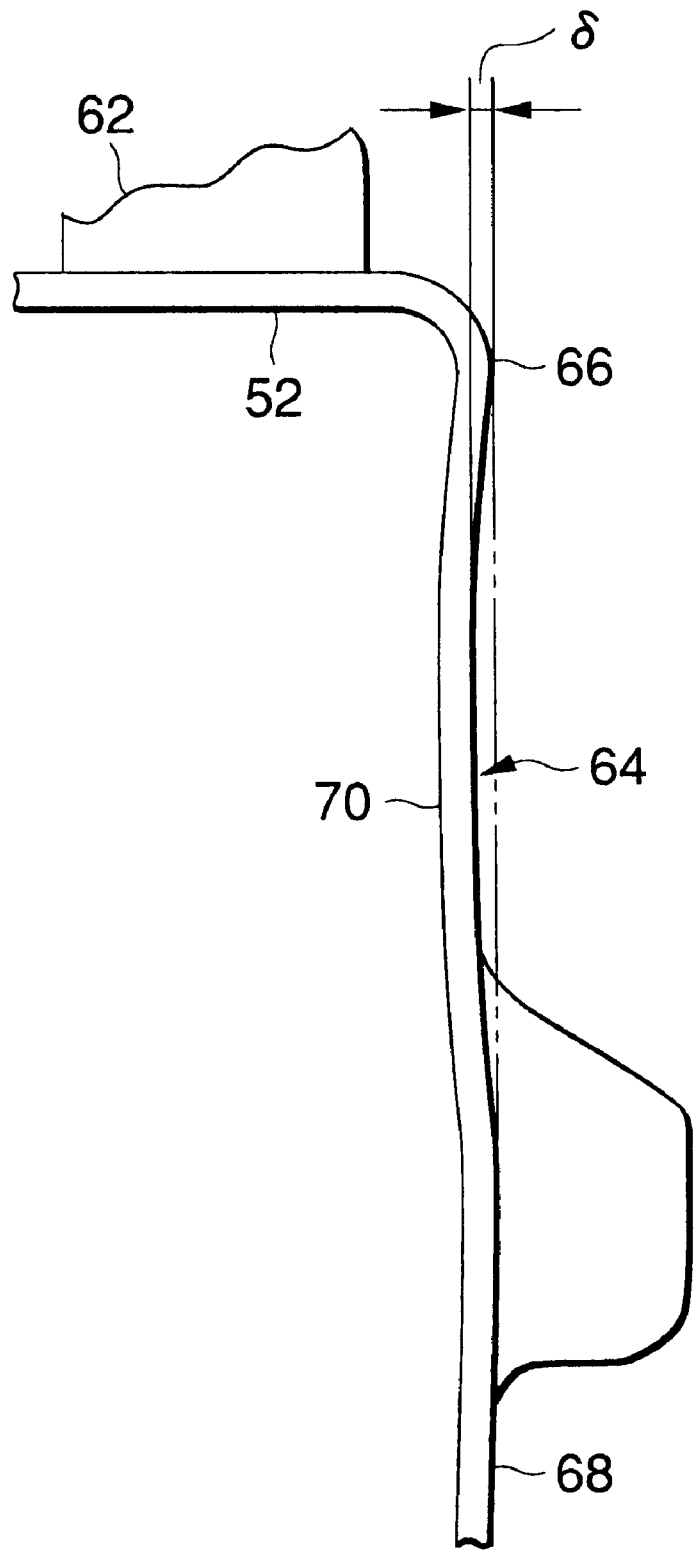
FIG. 5

FIG. 1 is a typical view of a pad clip according to a first embodiment of the invention, showing a state thereof in which it is mounted in a disc brake; FIG. 2 (1) is a plan view of the pad clip according to the first embodiment of the invention, and FIG. 2 (2) is a front view thereof; FIG. 3 is a bottom view of the pad clip according to the first embodiment; FIG. 4 is a section view taken along the line A—A shown in FIG. 2 (2); and, FIG. 5 is an enlarged view of a B portion shown in FIG. 4.

In these figures, a pad clip 40 is formed by bending a piece of metal plate into such a shape that its rotor inner and outer side portions are symmetrical to each other and, as shown in FIG. 2, the pad clip 40 is formed in a gate shape including a bridge portion 42 which stretches over the outer peripheral portion of a rotor and connects the rotor inner and outer side portions of the pad clip 40. In the two side lower portions of the pad clip 40 which are respectively disposed below the bridge portion 42, there are provided integrally therewith inner and outer side connecting portions 44 and, in the respective lower portions of the two connecting portions 44, there are provided U-shaped portions 46 (the U shape can be seen when the pad clip 40 is viewed from the side surface side thereof) into which guide projections 16 respectively formed in the mutually opposing portions of a support 14 and a friction pad 20 can be inserted for engagement.

The U-shaped portion 46, as shown in detail in FIG. 4, comprises a bottom plate piece 48 facing the leading end face of the guide projection 16 of the support member 14, and a pair of opposing pieces 50 and 52 which are the mutually opposing portions of the U-shaped portion 46 respectively formed by bending and extending the upper and lower end portions of the bottom plate piece 48, while the leading end portion 54 of the upper side opposing piece 50 situated on the rotor outer peripheral side is connected to the connecting portion 44. The upper side opposing piece 50 is structured in the following manner: the leading end portion 54 side thereof is slightly bent toward the lower side opposing piece 52; the base end portion 56 side thereof is formed so as not to be in contact with the guide projection 16; the outer surface thereof can be in contact with the wall surface of a recessed portion 22 formed in the friction pad 20 into which the guide projection 16 is to be inserted; the inner surface side of the leading end portion 54 can be butted against the upper surface of the guide projection 16; and, when the leading end portion 54 of the upper side opposing piece 50 and the lower side opposing piece 52 hold the guide projection 16 between them, the upper side opposing piece 50 can be held and retained by the support member 14 and, the base end portion 56 of the upper opposing piece 50 can support the friction pad 20 elastically through the recessed portion 22 thereof. Also, in each of the U-shaped portions 46, on the facing side of the bottom plate piece 48 to the rotor, there is provided integrally therewith a hold claw 58 which faces toward the base end side of the guide projection 16 and, on the opposite side of the upper and lower opposing pieces 50 and 52 to the rotor, there are provided integrally therewith hold claws 60 and 62 which are situated in the side portion of the guide projection 16. These hold claws 58, 60 and 62 hold the guide projection 16 of the support member 14, thereby preventing the U-shaped portion 46 from shifting in position with respect to the support member 14.

Below the U-shaped portion 46, there is provided a second spring portion 64, while the upper end portion 66 of the second spring portion 64 is connected to the leading end portion of the lower side opposing piece 52. Also, the second spring portion 64 is interposed between a pad anchor portion 31 formed in the friction pad 20 and a pad anchor portion 32 formed in the support member 14 which respectively serve as the rotor peripheral direction opposing portions of the friction pad 20 and support member 14. As shown in FIG. 4, the second spring portion 64 is curved and protruded toward the friction pad 20 situated in the rotor peripheral direction, thereby providing a projecting shape. Second spring portion 64 is structured such that, when the pad clip 40 is situated between the support member 14 and friction pad 20, not only the spring upper and lower end portions 66 and 68 of the second spring portion 64 are butted against the anchor portion 32 of the support member 14 but also the protrusion top portion 70 thereof is butted against the end face of the pad anchor portion 31 of the friction pad 20. Also, as shown in FIG. 5 the second spring portion 64 is further structured such that, when the upper and lower end portions 66 and 68 thereof are in contact with the support member 14 and the protrusion top portion 70 thereof is in contact with the friction pad 20, a gap δ can be formed in the rotor peripheral direction between the support side surface of the protrusion top portion 70 and the support member 14, whereby the second spring portion 64, due to its spring force, applies such a force to the support member 14 and friction pad 20 that it causes them to move away from each other, thereby energizing the friction pad 20 in the peripheral direction of the rotor. Further, in the side portions of the second spring portion 64 on the counter-rotor side, claw portions 72 are integrally provided which are used to hold the two sides of the support member between them (see FIG. 2).

Now, the pad clip 40 includes, in the lower end portion thereof which serves as the rotor radial direction one side thereof, a first spring portion 74 which elastically supports the lower end portion of the friction pad 20 to thereby energize the friction pad 20 outwardly in the radial direction of the rotor. The first spring portion 74 is connected to the U-shaped portion 46 through the second spring portion 64 serving as the connecting portion and, in particular, is connected to the spring lower end portion 68 of the second spring portion 64 which is situated on the rotor radial direction central side of the second spring portion 64. The first spring portion 74 includes a curved portion 76 connected to the spring lower end portion 68, the leading end side of the curved portion 76 is curved in such a manner that it is directed obliquely in the upward direction on the friction pad side, and there is provided a linear portion 78 in the leading end portion of the curved portion 76. Also, on the leading end side of the linear portion 78, a turn portion 80 is formed integrally therewith which is curved obliquely in the upward direction. Further, the turn portion 80 includes a leading end portion which is curved again slightly downwardly, while the upper surface of the present curved portion provides a contact portion 82 which can be butted against the lower surface of the friction pad 20 to thereby support the friction pad 20. The contact portion 82, as shown clearly in FIG. 2 (1), is formed slightly wider than the remaining portions of the first spring portion 74. In particular, the side end of the contact portion 82 projects toward the counter-rotor side, so that not only can it be used as a guide when the friction pad 20 is mounted onto the support member 14 but also to energize the friction pad 20 outwardly (in FIG. 1, upwardly) in the rotor radial direction due to the spring force of the curved portion 76. By the way, a portion, which is shown by a two-dot chained line in the lower left portion of FIG. 2 (2), is a developed view of the first spring portion 74.

According to the embodiment structured in the above-mentioned manner, as can be seen in FIG. 1 which shows a typical pad clip of the present invention mounted in a disc brake, if the pad clip 40 is arranged between the support member 14 and friction pad 20, then the upper and lower end portions 66 and 68 of the second spring portion 64 are butted against the anchor portion 32 of the support member 14, and the protrusion top portion 70 of the second spring portion 64 is butted against the end face of the pad anchor portion 31 of the friction pad 20. In the second spring portion 64, there is formed the gap δ in the rotor peripheral direction between the upper and lower end portions 66 and 68 thereof in contact with the anchor portion 32 of the support member 14 and the support member 14 side surface of the protrusion top portion 70, whereby the second spring portion 64 applies a spring force to the support member 14 and friction pad 20 in a direction where they are caused to move away from each other. Therefore, even if vibrations are applied to the caliper and the friction pad 20 is thereby moved in a manner like arrow 84 shown in FIG. 1, the possibility that the friction pad 20 can tap the second spring portion 64 to generate a shock sound, is eliminated thereby restricting the generation of a rattling noise. Also, since the second spring portion 64 is structured such that the upper and lower end portions 66 and 68 thereof can be butted against the support member 14, the second spring portion 64 is able to generate a large spring force, which ensures the restriction of the generation of the rattling noise.

Additionally, if the friction pad 20 is moved to the right in FIG. 1 and the pad anchor portion 31 is thereby pressed against the second spring portion 64 in the brake start time or the like, then the second spring portion 64 is elastically deformed to collapse. Therefore, the first spring portion 74, and in particular, the curved portion 76 thereof will rotate clockwise in FIG. 1 around the lower end portion 68 of the second spring portion 64, so that a force to push up the friction pad 20 is given to the contact portion 82 to thereby increase a force which energizes the friction pad 20 outwardly in the rotor radial direction. As a result of this, the upper surface of the pad anchor portion 31 is strongly pressed against the lower side opposing piece 52 of the U-shaped portion 46. That is, since the vibrations of the friction pad 20 can be restricted and absorbed due to the multiplier effect of the increase in the energizing force of the first spring portion 74 and the elastic deformation of the second spring portion 64, the restriction effect of the generation of the rattling noise can be improved.

Conversely, if the friction pad 20 is further moved to the right in FIG. 1 during brake time, then the second spring portion 64 of the friction pad 20 is pressure held by and between the pad anchor portion 31 of the friction pad 20 and the anchor portion 32 of the support member 14 and is thereby collapsed, so that the collapsed second spring portion 64 is in close contact with the anchor portion 32 to thereby be able to transmit a brake torque from the pad anchor portion 31 to the support member 14. Also, the gap between the end face of the pad anchor portion 31 of the friction pad 20 and the anchor portion 32 of the support member 14 during non-brake time can be formed similarly to the conventional pad clip, which provides no obstacle to the movement of the friction pad 20 in the rotor axial direction, so that the braking operation can be executed positively.

By the way, in the above-mentioned embodiment, description has been given of a case in which the second spring portion 64 applies such a force to the friction pad 20 and support member 14 that it causes them to move apart from each other. However, according to the present embodiment, even when the second spring portion 64 is in light contact with both the friction pad 20 and the support member 14 or even when the second spring portion 64 is in contact with either the friction pad 20 or the support member 14 and has a slight gap with respect to the other, the restriction effect of the generation of the rattling noise can also be obtained.

Figure 6:
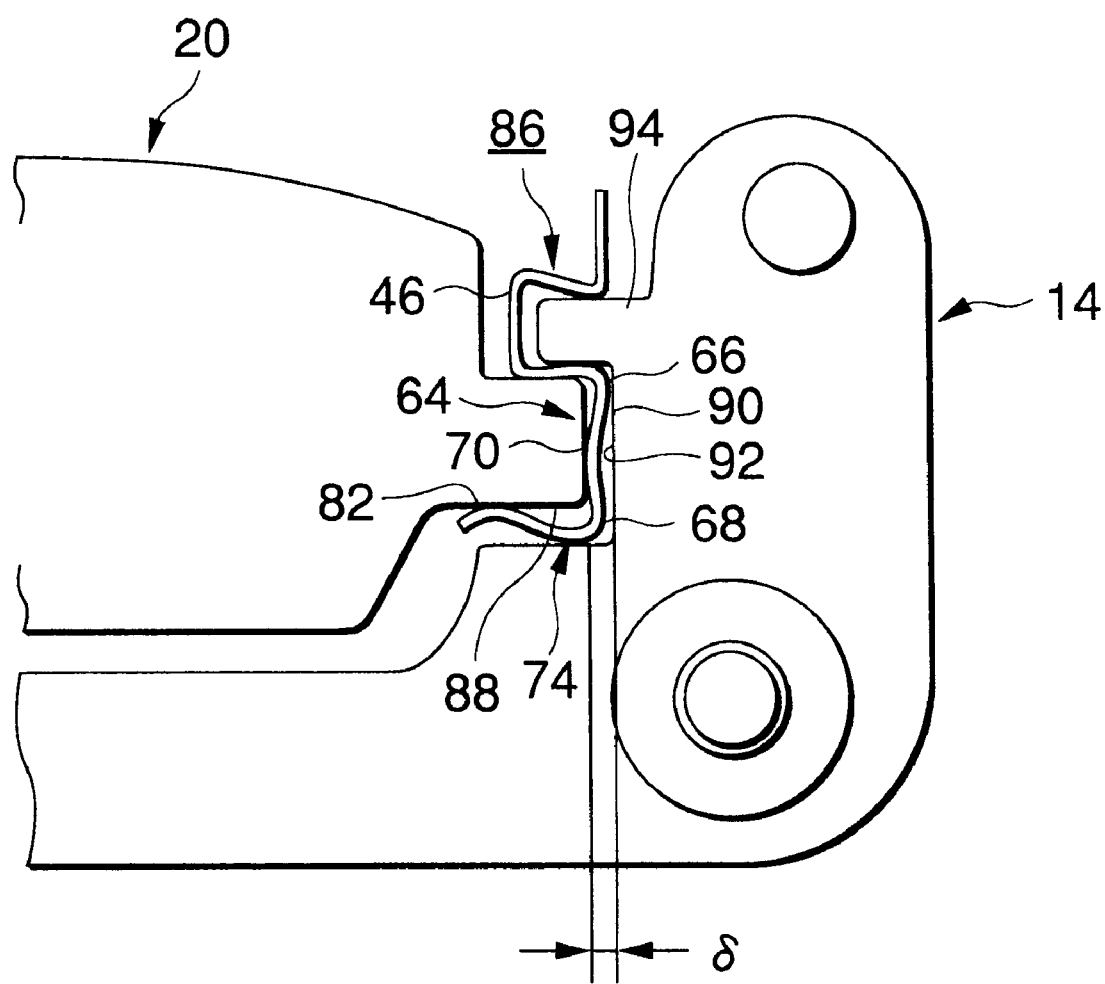
FIG. 6

Now, FIG. 6 is a typical view of a pad clip of a second embodiment according to the invention, showing a state thereof in which it is mounted in a disc brake. In the present embodiment, there is provided a pad clip 86 for use in a disc brake structured such that an anchor projection 88 is provided on the side end face of the friction pad 20 opposed to the support member 14 and, in the support member 14, a recessed groove portion 90 is formed into which the anchor projection 88 can be inserted. The pad clip 86 according to the second embodiment of the invention is formed in such a manner that the second spring portion 64 thereof can be positioned between the end face of the anchor projection 88 and the anchor surface 92 of the recessed groove portion 90 that faces the anchor projection 88 end face. Also, the U-shaped portion 46 of the pad clip 86 is formed such that it can be engaged with a projection 94 provided on the upper portion of the recessed groove portion 90 of the support member 14 to thereby hold the same between the two sides thereof. The thus structured pad clip 86 according to the second embodiment can also provide a similar effect to the pad clip 40 according to the previously described first embodiment.

Figure 7:
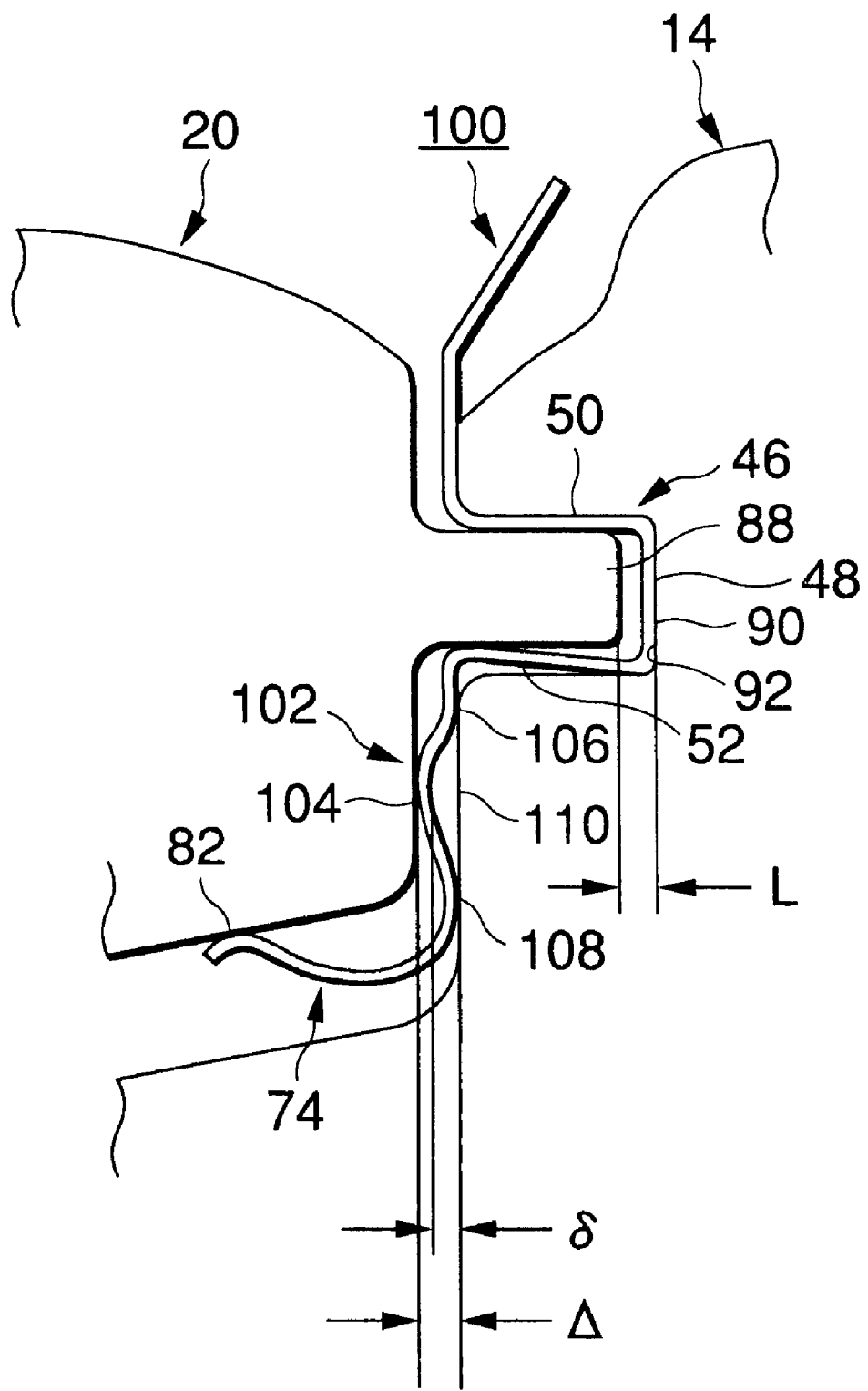
FIG. 7
Figure 8:
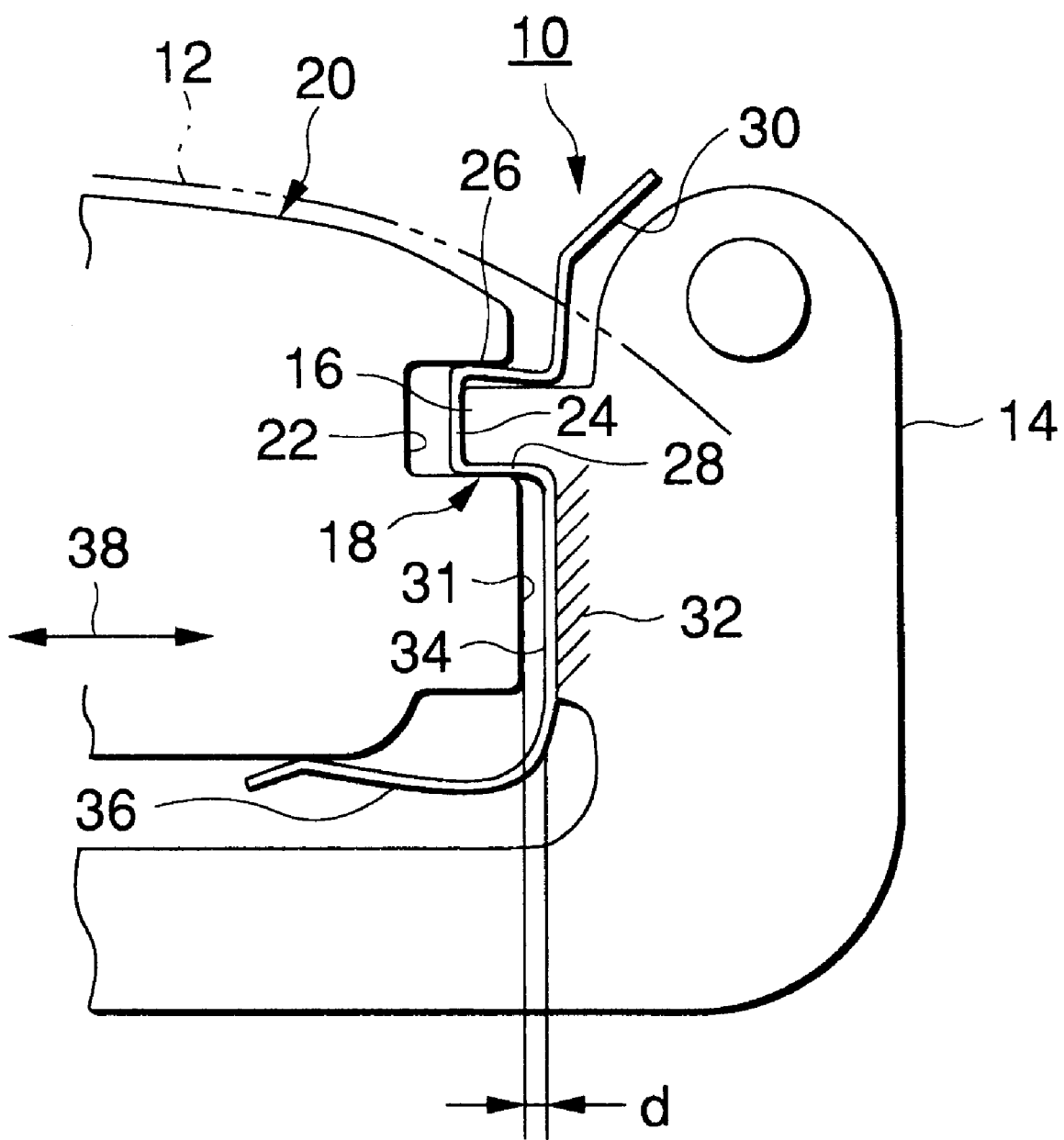
FIG. 8

Now, FIG. 7 is a typical view of a pad clip according to a third embodiment of the invention, showing a state thereof in which it is mounted in a disc brake. A pad clip 100 according to the third embodiment is structured such that the U-shaped portion 46 thereof can be engaged with an anchor projection 88 provided on the side end face of the friction pad 20. The U-shaped portion 46 is structured in such a manner that the outer surface of the bottom plate piece 48 thereof is in close contact with an anchor surface 92 which is the bottom surface of a recessed groove portion 90 formed in the support member 14, the base end portion of the lower side opposing piece is in contact with the inner wall of the recessed groove portion 90, and the leading end portion of the lower side opposing piece 52 is curved slightly upwardly so as to prevent the same from touching the recessed groove portion 90 and is contacted with the lower surface of the anchor projection 88 of the friction pad 20 to thereby support the anchor projection 88 elastically. Also, in the leading end side lower portion of the lower side opposing piece 52, there is provided a second spring portion 102 which is formed integrally with the U-shaped portion 46 and is so curved as to protrude toward the friction pad 20.

The second spring portion 102 is structured such that the protrusion top portion 104 thereof is in contact with the side end face of the friction pad 20, while the spring upper end portion 106 and spring lower end portion 108 thereof are respectively in contact with the opposing face 110 of the support member 14 facing the side end face of the friction pad 20. Additionally, the second spring portion 102 is structured such that a gap δ can be formed between the support member 14 side face of the protrusion top portion 104 and the opposing face 110 of the support member 14. Also, a gap □, which is formed during non-braking between the mutually opposing portions of the friction pad 20 and support member 14 where the second spring portion 102 is positioned, is set larger than a distance L from the end face of the anchor projection 88 of the friction pad 20 to the anchor surface 92 of the recessed groove portion 90 of the support member 14, whereby, during braking time, a brake torque from the anchor projection 88 of the friction pad 20 can be positively transmitted to the support member 14 through the pad clip 100. Further, the lower portion of the second spring portion 102, is continuously connected to a first spring portion 74 which is structured such that the leading end contact portion 82 thereof can be in contact with the lower surface of the friction pad 20 to thereby energize the friction pad 20 outwardly in the radial direction of the rotor. According to the present embodiment, if the second spring portion 102 is pushed and collapsed by the friction pad 20, then the force to push up the friction pad 20 increases in the contact portion 82 of the first spring portion 74 and in the leading end portion of the lower opposing piece 52 of the U-shaped portion 46, which in turn increases a force to energize the friction pad 20 outwardly in the rotor radial direction.

As has been described heretofore, according to the invention, due to provision of the first spring portion for energizing the friction pad outwardly in the rotor radial direction and the second spring portion for energizing the friction pad in the peripheral direction of the rotor member, if the pad clip is positioned between the friction pad and support member, then the second spring portion substantially decreases the gap between the friction pad and pad clip and, therefore, even if the friction pad is moved in the rotor peripheral direction due to the vibration of the caliper or the like, the possibility that a shock that allows the friction pad to tap the pad clip can be produced is eliminated, thereby restricting the generation of the rattling noise. Especially, if the second spring portion is formed in a shape projecting in the rotor peripheral direction and is brought into contact with both friction pad and support, then no gap exists neither between the friction pad and second spring portion nor between the second spring portion and support, so that the generation of the rattling noise can be restricted more effectively. Additionally if the friction pad moves in the rotor peripheral direction to press against the projection-shaped second spring portion, then the second spring portion is elastically deformed and is thereby collapsed and the force of the cravingly shaped first spring portion to energize the friction pad outwardly in the rotor radial direction increases with the collapse of the second spring portion, so that the thus increased energizing force presses the end portion of the friction pad against the upper portion of the U-shaped portion strongly. Therefore, because of the multiplier effect obtained by the spring action due to the elastic deformation of the second spring portion and the energizing force of the first spring portion outwardly in the rotor radial direction, the restriction effect of the generation of the rattling noise can be improved further.

What is claimed is:

1. A pad clip for use in a disc brake which includes a friction pad disposed opposite a rotor and a support for supporting a brake force from the friction pad, the pad clip mounted in the disc brake between a rotor peripheral direction end portion of the friction pad and an anchor portion of a support member, the pad clip comprising:

a U-shaped portion engageable with a projection provided in one of the mutually opposing portions of the friction pad and the support member;

a first spring portion for energizing the friction pad outwardly in the radial direction of the rotor; and a second spring portion disposed in a connecting portion for connecting the first spring portion with the U-shaped portion and capable of energizing the friction pad in the peripheral direction of the rotor, where the second spring portion is curved and protruded toward the friction pad situated in the rotor peripheral direction, wherein, when the rotor moves in the rotor peripheral direction and pushes the second spring portion, the first spring portion increases an energizing force in the radial outward direction of the rotor.

2. The pad clip for a disc brake according to claim 1, wherein the second spring portion for energizing the friction pad in the rotor peripheral direction is formed in a projecting shape which projects in the peripheral direction of the rotor.

* * * * *